(12) United States Patent
Schou et al.

(10) Patent No.: US 11,957,995 B2
(45) Date of Patent: Apr. 16, 2024

(54) TOY SYSTEM FOR AUGMENTED REALITY

(71) Applicant: LEGO A/S, Billund (DK)

(72) Inventors: Anders Antoft Schou, Vejle (DK); Andrei Zavada, Billund (DK); Jesper Søderberg, Billund (DK)

(73) Assignee: LEGO A/S, Billund (DK)

( * ) Notice: Subject to any disclaimer, the term of this patent is extended or adjusted under 35 U.S.C. 154(b) by 439 days.

(21) Appl. No.: 17/424,946

(22) PCT Filed: Jan. 22, 2020

(86) PCT No.: PCT/EP2020/051449
§ 371 (c)(1),
(2) Date: Jul. 22, 2021

(87) PCT Pub. No.: WO2020/152189
PCT Pub. Date: Jul. 30, 2020

(65) Prior Publication Data
US 2022/0096947 A1 Mar. 31, 2022

(30) Foreign Application Priority Data
Jan. 23, 2019 (DK) .............................. PA201970046

(51) Int. Cl.
*A63F 13/30* (2014.01)
*A63H 33/04* (2006.01)
(Continued)

(52) U.S. Cl.
CPC ........... *A63H 33/086* (2013.01); *A63F 13/30* (2014.09); *A63H 33/042* (2013.01);
(Continued)

(58) Field of Classification Search
None
See application file for complete search history.

(56) References Cited

U.S. PATENT DOCUMENTS

| | | |
|---|---|---|
| 2014/0267404 A1 | 9/2014 | Mitchell et al. |
| 2016/0225137 A1 | 8/2016 | Horovitz |
| 2018/0005435 A1* | 1/2018 | Anderson ............... G06F 3/017 |
| 2018/0060946 A1 | 3/2018 | Devries |
| 2018/0197345 A1 | 7/2018 | Xiong |

FOREIGN PATENT DOCUMENTS

| | | |
|---|---|---|
| CN | 103702726 A | 4/2014 |
| GB | 201419928 | 12/2014 |

(Continued)

OTHER PUBLICATIONS

First Office Action issued in corresponding Chinese Patent Application No. 202080010379.8, dated Apr. 29, 2022, 11 pages (English translation only).

(Continued)

*Primary Examiner* — Robert T Clarke, Jr.
(74) *Attorney, Agent, or Firm* — Day Pitney LLP; Anthony A. Kassas

(57) ABSTRACT

A toy system, the toy system comprising a data processing system and one or more toys, the plurality of toys including at least one reference toy having a visual appearance recognisable by the data processing system in a captured image of a real-world scene including said at least one reference toy, the data processing system comprising an image capturing device, a processing unit, and a display, wherein the data processing system has stored thereon information associated with the at least one reference toy, the information including at least one predetermined reference position defined relative to the at least one reference toy; and wherein the data processing is configured to: capture a sequence of images of a real-world scene, the real-world scene including said at least one reference toy; process the captured images to detect and recognize said at least one reference toy within the real-world scene; retrieve the at least one predetermined reference position from the stored information associated with the recognized at least on reference toy; process the (Continued)

captured images to identify the at least one predetermined reference position within at least a first image of the sequence of captured images; selectively process a sub-image within the first image, the sub-image depicting said identified reference position to selectively detect a user manipulation of the real-world scene at the identified at least one predetermined reference position; responsive to detecting the user manipulation, generate and render computer-generated perceptual information associated with the detected user manipulation.

14 Claims, 7 Drawing Sheets

(51) Int. Cl.
  *A63H 33/08* (2006.01)
  *G06T 19/00* (2011.01)
(52) U.S. Cl.
  CPC .. *A63F 2300/8082* (2013.01); *A63H 2200/00* (2013.01); *G06T 19/006* (2013.01)

(56) References Cited

FOREIGN PATENT DOCUMENTS

| WO | 2012/160057 A1 | 11/2012 |
| WO | 2014/145532 A1 | 9/2014 |
| WO | 2016/128610 A1 | 8/2016 |
| WO | 2017/029279 A2 | 2/2017 |

OTHER PUBLICATIONS

First Technical Examination and Search Report issued in corresponding Danish patent application No. PA 201970046, dated Jul. 4, 2019, 9 pages.

International Preliminary Report on Patentability issued in corresponding international patent application No. PCT/EP2020/051449, dated Jan. 21, 2021, 19 pages.

Written Opinion of the International Searching Authority issued in corresponding international patent application No. PCT/EP2020/051449, dated Jul. 30, 2020, 8 pages.

* cited by examiner

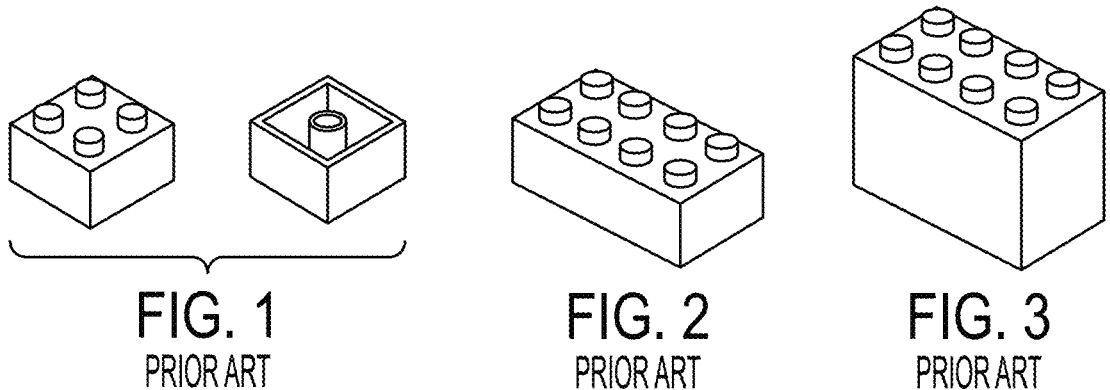
FIG. 1 PRIOR ART
FIG. 2 PRIOR ART
FIG. 3 PRIOR ART
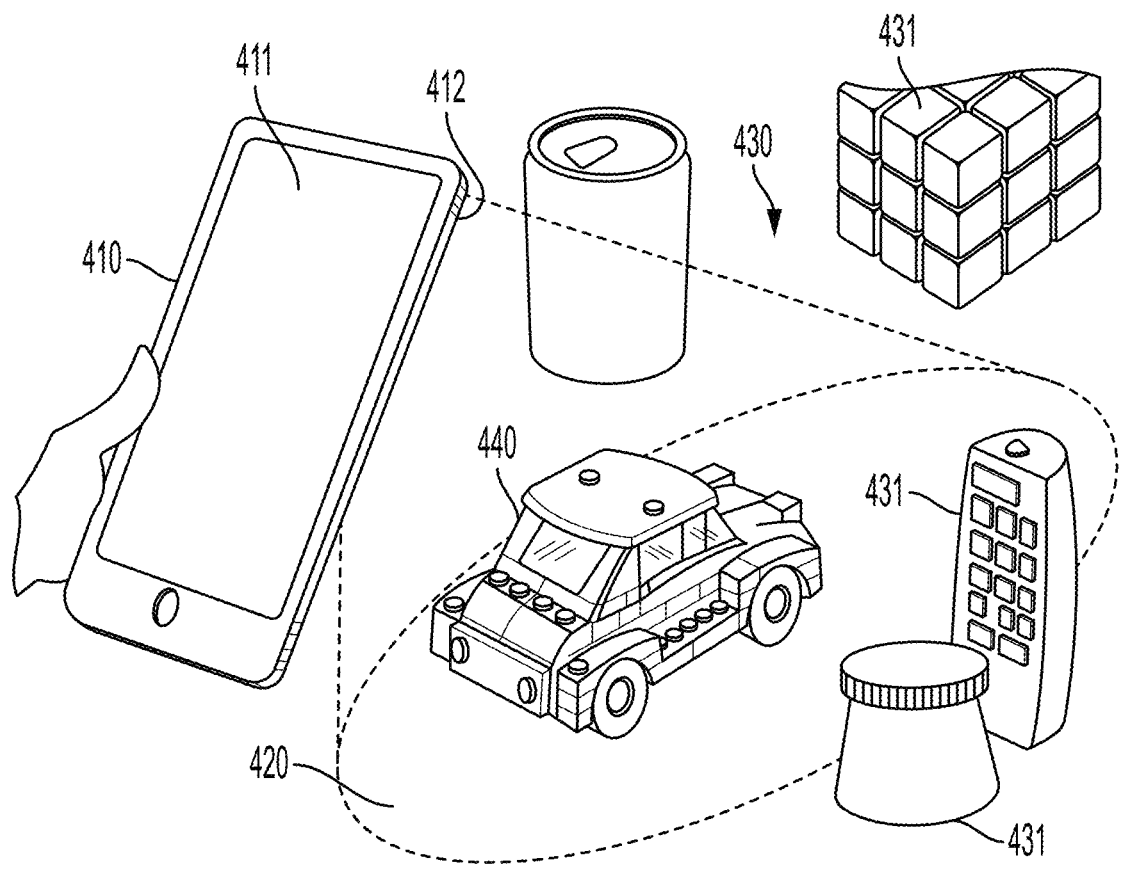
FIG. 4

TOY SYSTEM FOR AUGMENTED REALITY

CROSS-REFERENCE TO RELATED APPLICATIONS

This application is a U.S. National Stage of International Application No. PCT/EP2020/051449, filed on 22 Jan. 2020 and published on 30 Jul. 2020, as WO2020/152189, which claims the benefit of priority to Danish Patent Application No. PA 2019 70046, filed on 23 Jan. 2019. The content of each of the above referenced patent applications is incorporated herein by reference in its entirety for any purpose whatsoever.

FIELD OF THE DISCLOSURE

The disclosure relates to toy systems for augmented reality. The toy system may be a toy construction system comprising construction elements with coupling members for detachably interconnecting construction elements.

BACKGROUND

Toy systems and, in particular, toy construction systems have been known for decades. In particular, toy construction systems comprising toy construction elements having coupling members for detachably interconnecting construction elements with each other have gained high popularity. The simple building blocks have been supplemented with dedicated construction elements with a mechanical or electrical function to enhance the play value. Such functions include e.g. motors, switches and lamps.

More recently, toy systems that utilise augmented reality (AR) have attracted increased interest. Augmented reality (AR) is a technology where a captured live view of one or more items of a physical, real-world environment is augmented by computer-generated content, such as graphics, sound etc., i.e. where a user is presented with a composite representation comprising the live view of the environment and the computer-generated content, e.g. in the form of an overlay of computer-graphics onto the live view. An overlay may be additive to the natural environment or it may mask or replace the live view of the natural environment. For example computer-generated graphics may be rendered on top of the live view or as a replacement where parts of the live view are replaced by computer-generated graphics. For the purpose of the present description, a computer-implemented system implementing AR will generally be referred to as an AR system. An AR system generally comprises an image capturing device, a suitably programmed processing unit and a display.

In an AR system, image features are often detected and recognized within the captured view of a real-world scene, and the AR system may then generate a computer-generated image (or other computer-generated content, such as sound, haptic feedback, etc.) in dependence upon the designated image feature and superimpose the generated image on the captured view (or otherwise render the computer-generated content).

It is generally desirable to provide mechanisms that allow a user to interact with the augmented-reality environment by manipulating the physical scene. To this end, it is desirable that the AR system detects manipulations of objects in the real world scene.

WO 2012/160055 describes a toy construction system comprising an augmented reality system.

The detection of manipulations of the physical scene requires considerable processing power, in particular when the real-world scene of which the system captures images changes frequently. This may e.g. be the case when the user frequently manipulates the real-world scene or manipulates multiple aspects of the real-world scene or manipulates the real-world scene in a manner that is largely unpredictable for the AR system. Generally such manipulations may include moving objects around, adding objects to the real-world scene or removing objects from the real-world scene. In many situations the image capturing device may be a hand-held or otherwise movable device, e.g. a mobile phone, tablet computer or the like. Accordingly, the viewpoint from which the image capturing device captures images of a real-world scene may change. In the above scenarios the data processing system may have to process constantly changing images so as to detect and recognize manipulations of the real-world scene, if any.

It is generally desirable to reduce the required processing power for this task. This may be desirable in order to provide a smoother real-time experience even with a device having limited processing power or a device which concurrently executes other processes requiring processing power, such as a graphics engine for creating the augmented-reality graphics, a game engine or completely unrelated tasks running concurrently with the augmented-reality processes. A reduction of the required processing power may also be desirable in order to reduce the power consumption of the data processing system. This may be particularly desirable when the data processing system is battery-driven, e.g. when the data processing system is a handheld processing device such as a mobile phone or tablet computer.

It is thus generally desirable to reduce the processing resources such as processing time or processing power required for detecting and recognizing manipulations of a physical real-world scene in a toy system for augmented reality.

Another problem arising in toy systems for augmented reality relates to the normal use scenarios of such systems. These systems are often used by children where the real-world scene of which the images are captured may include many objects, some of which related to the augmented-reality game while others may be other toys or different objects occupying the real-world scene. This may e.g. be the case when the real-world scene is a real-world scene on a child's desk, a kitchen table, the floor of a child's room, etc. which may be occupied by many objects, some of which may even be detectable or even recognizable by the augmented-reality system. The presence of such objects in the real-world scene render the image processing tasks even more demanding and may result in the unintentional detection or recognition of objects which the user does not intend to capture. Such undesired detection may result in unexpected and frustrating experience for the user.

It is thus desirable to provide a toy system for augmented reality that reduces the risk of undesired detection and recognition of objects.

Generally, it remains desirable to provide a close integration of the physical toys of the toy system and a virtual reality generated on a computer.

It is further generally desirable to provide a toy system that allows small children, e.g. pre-school children, to combine physical toys, e.g. one or more physical toy construction models, with a virtual, computer-generated play experience.

It is also generally desirable to provide a toy system that is suitable for children without a detailed understanding of programming techniques, control systems, or the like.

It is also generally desirable to enhance the educational and play value of toy systems.

At least some embodiments of the toy system and other aspects disclosed herein seek to address one or more of the above problems and/or other problems arising when applying augmented-reality to toy systems.

SUMMARY

Disclosed herein are embodiments of a toy system comprising a data processing system and one or more toys. The one or more toys include at least one reference toy having a visual appearance recognisable by the data processing system in a captured image of a real-world scene including said at least one reference toy. The data processing system comprises an image capturing device, a processing unit, and a display, wherein the data processing system has stored thereon information associated with the at least one reference toy, the information including at least one predetermined reference position defined relative to the at least one reference toy.

According to a first aspect, the data processing system is configured to:
capture a sequence of images of a real-world scene, the real-world scene including said at least one reference toy;
process the captured images to detect and recognize said at least one reference toy within the real-world scene;
retrieve the at least one predetermined reference position from the stored information associated with the recognized at least on reference toy;
process the captured images to identify the at least one predetermined reference position within at least a first image of the sequence of captured images;
selectively process a sub-image within the first image, the sub-image depicting said identified reference position to selectively detect a user manipulation of the real-world scene at the identified at least one predetermined reference position;
responsive to detecting the user manipulation, generate and render computer-generated perceptual information associated with the detected user manipulation.

Accordingly, the system selectively processes only a sub-image within the first image, the sub-image depicting a predetermined reference position. This considerably reduces the required processing resources for detecting and, optionally, recognizing the user manipulation. Moreover, when the system selectively looks for a user manipulation only within a sub-image, the risk for erroneously detection of a user manipulation and/or erroneous recognition of a different user manipulation is reduced. Therefore a more reliable and more efficient detection of user manipulations of the physical real-world scene is provided. The identification of the reference positions is provided based on the recognized reference toy and may thus be reliably tracked in the live view of the real-world scene.

In some embodiments, the AR system may prompt the user to perform the user manipulation at the reference point, e.g. by providing graphical effects at or in the vicinity of the reference position in the image, by playing sounds, or in another suitable manner.

Accordingly, according to another aspect, the data processing is adapted to:
capture a sequence of images of a real-world scene, the real-world scene including said at least one reference toy;
process the captured images to detect and recognize said at least one reference toy within the real-world scene;
retrieve the at least one predetermined reference position from the stored information associated with the recognized at least on reference toy;
process the captured images to identify the at least one predetermined reference position within at least a first image of the sequence of captured images;
generate and render computer-generated perceptual information prompting the user to manipulate the real-world scene at the identified at least one reference position;
process the captured images to detect a user manipulation of the real-world scene at the identified at least one predetermined reference position;
responsive to detecting the user manipulation, generate and render computer-generated perceptual information associated with the detected user manipulation.

Consequently, the system prompts the user to perform a certain user manipulation at a predetermined reference position known to the system. The system may thus selectively search for a detectable user manipulation at the predetermined reference position which facilitates a reliable and efficient detection. The identification of the reference positions is provided based on the recognized reference toy and may thus reliably be tracked in the live view of the real-world scene. Embodiments of the toy system thus provide an easy-to-use user-interaction which is suitable even for smaller for children.

Generally, the term user manipulation of the real-world scene as used herein refers to a manipulation of the real-world scene by one or more users of the system. It will be appreciated that embodiments of the system may be used by multiple users concurrently, e.g. one user may operate the data processing system and another user may manipulate the real-world scene. The term user manipulation is intended to include manipulations of the real-world scene by any one or more of the users.

In some embodiments, the system is configured to selectively look for a detectable user manipulation at the reference point during a limited time window after prompting the user to perform the manipulation at the reference point. Hence, the system may selectively processes, during a limited time window, only a sub-image within the first image, the sub-image depicting a predetermined reference position, and the system may create and render computer-generated content responsive to detecting a user manipulation, in particular a pre-determined user manipulation, at the reference point and during the limited time window. The system may thus create and render computer-generated content depending on whether a user manipulation and, optionally, whether a predetermined user manipulation, at the reference point has been detected within the time window or not. For example, the computer-generated content may be indicative of the successful completion of a task or of failure to complete the task.

Accordingly, in embodiments of the aspects described herein, the at least one reference toy defines a recognizable frame relative to which the system identifies one or more known reference positions. In some embodiments, the frame delimits a sub-scene of the captured real-world scene and the at least one reference point is defined within said sub-scene. For example, the at least one reference point may be a position on a surface of the reference toy.

The sub-image may include the reference position or may otherwise be defined relative to the reference position, e.g. directly above or below the reference position. The sub-image may have a suitable shape and size smaller than the captured image. The size of the sub-image may be predetermined or it may be determined dynamically, i.e. determined by the system based on the processing of the image. For example, the system may determine the shape and/or size of the sub-image based on one or more detected reference dimensions of the reference toy. Accordingly, the system may choose the sub-image such that it depicts a predetermined part of the reference toy. It will be appreciated that the shape and size of the sub-image may be chosen in dependence of the type of user manipulation to be detected and/or based on the detection mechanism used for said detection.

For example, in embodiments where the user manipulation involves the user placing a colored object at the reference point (or otherwise changing the color of the reference toy at the reference position), the detection of the user manipulation may merely require detection of a color at the reference position. This detection may only require a sub-image having a size of a single image pixel or a few image pixels. If, on the other hand, the detection of the user manipulation requires detection of geometric patterns, objects, etc. based on more than just a color, the sub-image may be chosen to be larger, e.g. large enough to depict the entire object to be recognized or at least the recognizable portion of the object.

The detected user manipulation may involve the user moving an element of the reference toy relative to the remainder of the reference toy, positioning an object at the reference position, moving an object away from the reference position, changing the orientation of an object at the reference position, e.g. changing the orientation of a toy relative to the image capturing device or changing the orientation of a first part of the reference toy relative to at least a second part of the reference toy.

Generally, detecting the user manipulation may comprise providing the sub-image as an input to a computer vision process, such as a feature detection process, an object recognition process and/or the like. For example, detecting the user manipulation may include detecting a color or a change in color, e.g. a change of a dominant color of the sub-image. Other examples of the detection of a user manipulation may include the detection of a color pattern, a marker, or the like, and/or a change thereof.

In some embodiments, detecting the user manipulation may include detecting the positioning, at the reference position, of a predetermined object or of one of a set of predetermined objects. The detection may include recognizing the positioned object. The object recognition may be based on neural networks or on another object recognition technique. One example of a suitable object recognition technique is disclosed in WO 2016/075081.

Selectively only using the sub-image for detecting the user manipulation, e.g. by an object recognition or other computer vision process, provides a process wherein recognition does not need to detect the object in a large image but is limited to detection within a specific sub-image. Moreover, the sub-image may have a predetermined background (e.g. a predetermined portion of the surface of the reference toy), thus further facilitating reliable detection of the user manipulation. Moreover, the selective recognition of objects only when positioned at the reference position avoids undesired recognition of objects that otherwise may be present in the real-world scene, e.g. when the real-world scene is a cluttered play area such as the floor of a child's room, the child's desk or the like.

In some embodiments, the data processing system is configured to selectively only detect one or a predetermined set of types of user interactions (rather than any arbitrary user manipulation), e.g. only detect certain colors, only detect positioning of a specific object or of one of a predetermined set of objects.

The initial detection and recognition of the reference toy may be based on any suitable detection and recognition method as generally known in the art of computer vision. The detection may be based on predetermined markers on the reference toy, on detectable features, such as edges, corners, etc. The recognition may be based on a machine learning technology, such as based on neural networks and/or any other suitable technology known as such in the art. The detection and recognition may result in the recognition of the reference toy as one of a set of predetermined reference toys. The process may thus retrieve additional information associated with the recognized reference toy. Additionally, the detection of the reference toy may include the detection of a position and orientation of the reference toy relative to a suitable reference, e.g. the position and viewing angle of the image capturing device, or the detection of the position and orientation of the object in the captured image. Accordingly, the system may retrieve information about one or more reference points relative to an internal coordinate system of the reference toy, based on the retrieved information and on the detection position and orientation of the reference toy in a captured image, the process may determine the location of the reference position within the captured image.

In some embodiments, the detection and recognition of the reference toy may be performed during an initialisation phase. To this end, AR system may allow the user to enter a selection indicative of a reference toy to be used. The user may then be prompted to direct the image capturing device towards the selected reference toy. To this end, the AR system may display a virtual frame or an outline of the selected reference toy so as to aid the user in positioning the image capturing device. Once the AR system has recognised the selected reference toy in the captured image, the AR system may track the recognised reference toy in the subsequently captured images even when the viewpoint of the image capturing devices changes.

Generally, the system may create and render the computer-generated content at a position in the displayed image relative to the detected position and orientation of the reference toy.

It will be appreciated that, depending e.g. on the current viewpoint from which the image capturing device captures the images, the reference position may not be visible from the current viewpoint of the image capturing device, e.g. because it is obscured by other parts of the reference toy. Accordingly, the AR system may selectively process a sub-image of the reference object only when the reference position is currently visible in the captured image. In some embodiments, the user may be prompted to perform the user manipulation only when the reference point is visible in captured images. In other embodiments, the user may also be prompted when the reference position is currently not visible in the captured image. In such an embodiment, the user may initially need to change the viewpoint of the image capturing device, e.g. by moving the image capturing device relative to the real-world scene, by moving the reference toy relative to the real-world scene, by moving any obstructing objects and/or a combination thereof.

In some embodiments, a reference toy may have associated with it more than one reference positions. Generally, all reference positions of all reference toys may have a common visual appearance so as to make them easily recognizable by the user, thus aiding accurate manipulation at the reference positions. It will be appreciated that the visual appearance of the reference positions is not required for the purpose of detecting them in the image, as their positions are known to the AR system once the system has detected and recognized the corresponding reference toy. Accordingly, the reference positions do not need to be visible for the purpose of detecting and recognizing the reference toy.

Generally, the at least one reference toy may be a single toy or an arrangement of multiple toys, e.g. arranged in a predetermined and recognizable spatial relationship relative to each other. In some embodiments, the at least one reference toy may be a toy construction model constructed from multiple toy construction elements of a toy construction system. Accordingly, the assembly of reference toys defines a user-constructed frame that is recognizable by the data processing system in the captured images and that defines predetermined reference positions relative to, in particular within, said frame.

Generally, toy construction systems often allow a large variety of different toy construction models to be constructed from a limited number of different types of toy construction elements, each toy construction model having a different physical configuration as defined by the spatial arrangement of the toy construction elements within the toy construction model. Generally, the term toy construction element refers to the smallest elements of the toy construction system that cannot be disassembled into smaller elements during normal use and, in particular, not be disassembled in a non-destructive manner and/or without the use of tools.

When the reference toy is a toy construction model, the reference position may be the position of a reference toy construction element within the toy construction model. In such an embodiment, all reference toy construction elements may have the same visual appearance (e.g. the same shape, size and color). In some embodiments, the toy construction system may include more than one type of reference toy construction element, e.g. of different shape and/or size and/or color. Each type of reference toy construction element may represent a respective detectable user interaction.

The provision of toy construction models as reference toys, allows the user to construct different reference toys from the same set of toy construction elements. Moreover, toy construction models allow an accurate definition of reference position within the model, as toy construction systems generally adhere to predetermined construction rules. In order to ensure reliable detection and recognition of the different reference toys thus constructed, the toy system may comprise building instructions for instructing the user to construct the reference toys that are recognizable by the system.

Each toy construction element of the toy construction system may comprise coupling members configured to engage coupling members of other toy construction elements of the toy construction system so as to detachably attach the toy construction elements to each other. To this end, the coupling members may utilize different coupling mechanisms, e.g. based on frictional engagement of the coupling members with each other, based on screws, plug-and-socket connections or other forms of mating engagements of cooperating coupling members.

Hence, toy construction elements that have been interconnected with each other by means of the coupling members can again be disconnected from each other such that they can be interconnected again with each other or with other toy construction elements of the system, e.g. so as to form a different spatial structure. In some embodiments, the toy construction elements are provided with a first and a second type of coupling members, such as coupling pegs and peg-receiving recesses for frictionally engaging the pegs, or other pairs of mating or otherwise complementary coupling members configured to engage each other so as to form a physical connection. One type of coupling members may be located on one side, e.g. the top side, of the toy construction element while another, complementary type of coupling members may be located on an opposite side, e.g. the bottom side, of the toy construction element. In some embodiments, the toy construction elements include pegs, e.g. extending from the top face of the toy construction element, and corresponding peg-receiving cavities, e.g. extending into the bottom face of the toy construction element, for frictionally engaging the pegs by a suitable clamping force.

Generally, the toy construction system may impose limitations on the degrees of freedom of how the toy construction elements may be attached to each other, e.g. by limiting the possible relative positions and/or orientations at which they can be attached to each other. These limitations facilitate the detection of and recognition of toy construction models constructed from the toy construction elements.

The coupling members may be positioned on grid points of a regular grid; in particular, the coupling members of the toy construction elements may be arranged such that the coupling members of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

In some embodiments, the toy construction elements are made from plastics material, e.g. thermoplastic polymers, or from another suitable material. The toy construction elements may e.g. be made by an injection molding process or by another suitable manufacturing process.

Embodiments of the toy construction system allow a user to construct a large variety of toy construction models facilitating AR functionality in a uniform and well-structured manner and with a limited set of different construction elements. For example, a toy construction system may be provided as a toy construction set comprising one or more toy construction elements and building instructions for constructing one or more reference toy construction models from the toy construction elements. Optionally, such a toy construction set may comprise one or more of the following: a computer-readable medium having stored thereon a computer program adapted to cause a computer to perform the steps of embodiments of the method described herein, instructions for obtaining such a computer program, and/or the like.

It is noted that the toy building sets may comprise further types of construction elements, such as active and/or passive construction elements with our without capabilities of performing or controlling actions/functions, such as conventional building blocks known in the art.

The different aspects of the present disclosure can be implemented in different ways including the toy system described in respect of the various embodiments of the aspects described above and in the following. Further aspects of the present disclosure can e.g. be implemented as corresponding methods, apparatus, and products. Each aspect, yields one or more of the benefits and advantages described in connection with at least one of the aspects described above, and each aspect having one or more preferred embodiments corresponding to the preferred embodiments described in connection with at least one of the aspects described above and in the following and/or disclosed in the dependant claims. Furthermore, it will be appreciated that embodiments described in connection with one of the aspects described herein may equally be applied to the other aspects.

In particular, a computer-implemented method is provided for generating an AR play experience, the process comprising:
  capturing a sequence of images of a real-world scene, the real-world scene including at least one reference toy;
  processing the captured images to detect and recognize said at least one reference toy within the real-world scene;
  retrieving at least one predetermined reference position from stored information associated with the recognized at least on reference toy, the information including at least one predetermined reference position defined relative to the at least one reference toy;
  processing the captured images to identify the at least one predetermined reference position within at least a first image of the sequence of captured images;
  selectively processing a sub-image within the first image, the sub-image depicting said identified reference position to selectively detect a user manipulation of the real-world scene at the identified at least one predetermined reference position;
  responsive to detecting the user manipulation, generating and rendering computer-generated perceptual information associated with the detected user manipulation.

According to another aspect, a computer-implemented method is provided for generating an AR play experience, the process comprising:
  capturing a sequence of images of a real-world scene, the real-world scene including at least one reference toy;
  processing the captured images to detect and recognize said at least one reference toy within the real-world scene;
  retrieving at least one predetermined reference position from stored information associated with the recognized at least on reference toy, the information including at least one predetermined reference position defined relative to the at least one reference toy;
  processing the captured images to identify the at least one predetermined reference position within at least a first image of the sequence of captured images;
  generating and rendering computer-generated perceptual information prompting the user to manipulate the real-world scene at the identified at least one reference position;
  processing the captured images to detect a user manipulation of the real-world scene at the identified at least one predetermined reference position;
  responsive to detecting the user manipulation, generating and rendering computer-generated perceptual information associated with the detected user manipulation.

Furthermore, a data processing system is provided that is configured, e.g. by suitable program code stored on the data processing system, to perform the steps of one or more of the computer-implemented methods described herein.

Yet further, a computer program product is provided comprising program code adapted to cause, when executed on a data processing system, a data processing system to perform the steps of one or more of the computer-implemented methods described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, an App, or the like, e.g. on a web server for download over the internet or other computer or communication network. In particular, an embodiment of a toy construction set may include toy construction elements, and installation instructions for installing a computer program product on a suitable data processing system.

A data processing system may include any suitable computer or other processing device, such as a PC, a portable or handheld computer, a tablet computer, a smartphone, and/or the like.

Embodiments of the data processing system include image capturing device, such as a digital camera, e.g. a video camera, a depth camera, or any other suitable device for obtaining an image of a real-world scene.

Embodiments of the data processing system include a processing unit configured to perform one or more image processing operations, such as feature detection operations, on a captured image. The sequence of captured images may include a stream of video frames.

Here and in the following, the term processing unit is intended to comprise any circuit and/or device suitably adapted to perform the functions described herein. In particular, the above term comprises general- or special-purpose programmable microprocessor, Digital Signal Processing units (DSP), Application Specific Integrated Circuits (ASIC), Programmable Logic Arrays (PLA), Field Programmable Gate Arrays (FPGA), special purpose electronic circuits, etc., or a combination thereof.

The display may be a display of a data processing device, e.g. the display of a smartphone, a tablet computer or other portable, e.g. hand-held, data processing device. Alternatively, the display may include a head-mounted display (HMD) worn on the forehead, such as a harness or helmet, eyeglasses with embedded display, a head-up display (HUD) or any other suitable display technology that allows the user to view a live feed of images of a real-world scene overlaid with computer-generated content.

The processing unit, the image capturing device and the display may be incorporated into a single housing, i.e. provided as a single, integrated device, or as two or more separate devices that may communicatively coupled with each other.

Embodiments of a toy construction set described herein thus allow a user to construct a large variety of toy construction models that may serve as respective reference toys, each reference toy triggering when recognized by the AR system a corresponding game experience.

Detecting user manipulations at the reference points may cause the AR system to perform functionality triggered by the detection, e.g. triggering events such as an activity or game event in a virtual environment, a behaviour of one or more virtual characters, etc.

BRIEF DESCRIPTION OF THE DRAWINGS

FIGS. 1-3 each show a prior art toy construction element.

FIG. 4 shows an embodiment of a toy system as disclosed herein.

DETAILED DESCRIPTION

Figure 5:
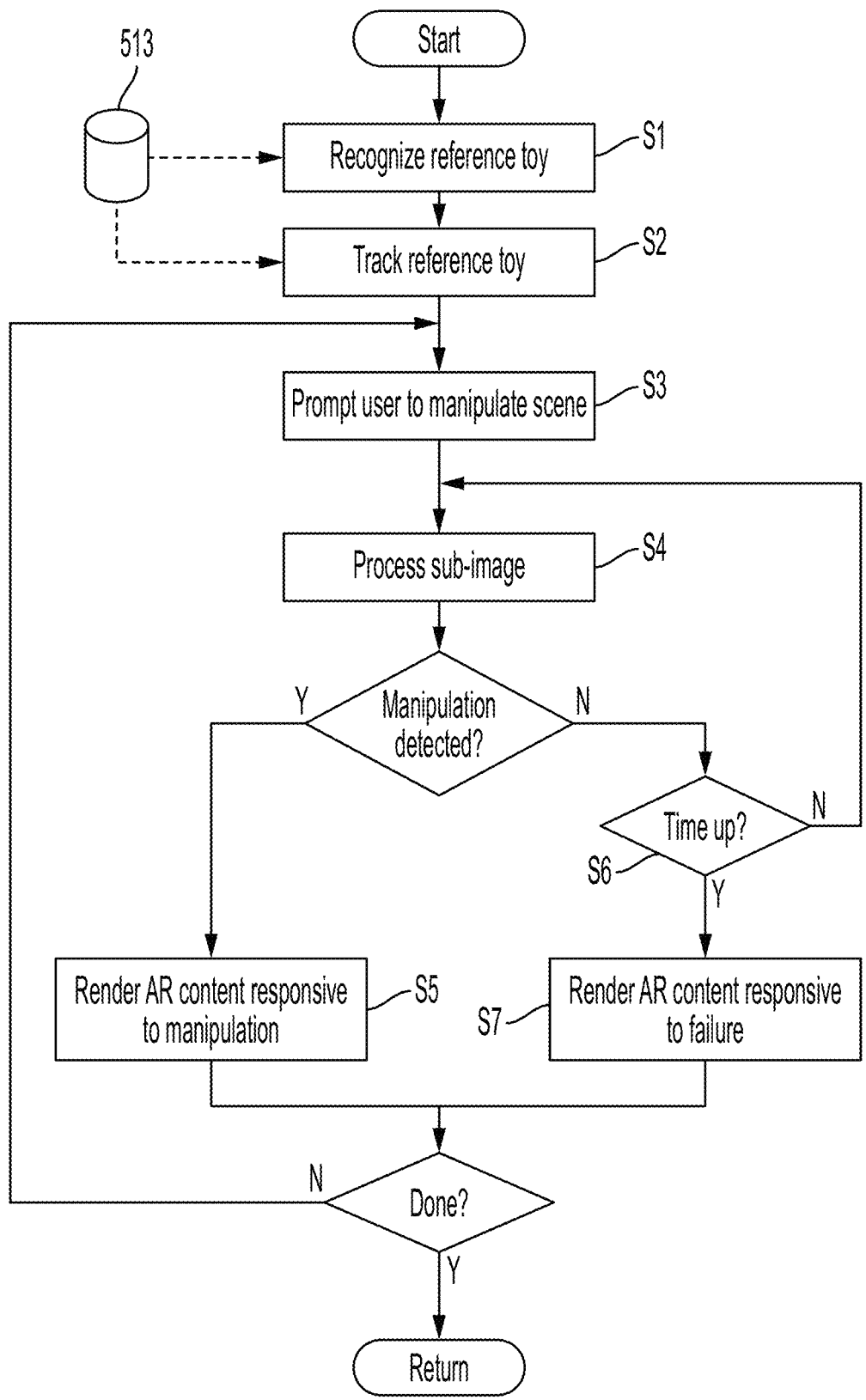
FIG. 5 shows a flow diagram of an example of a computer-implemented process as disclosed herein.

Various aspects and embodiments of toy construction systems disclosed herein will now be described with reference to toy construction elements in the form of bricks. However, the disclosure may be applied to other forms of toy construction elements and other forms of toys.

FIG. 1 shows a toy construction element with coupling pegs on its top surface and a cavity extending into the brick from the bottom. The cavity has a central tube, and coupling pegs on another brick can be received in the cavity in a frictional engagement as disclosed in U.S. Pat. No. 3,005,282. FIGS. 2 and 3 show other such prior art construction elements. The construction elements shown in the remaining figures have this known type of coupling members in the form of cooperating pegs and cavities. However, other types of coupling members may also be used in addition to or in-stead of the pegs and cavities. The coupling pegs are arranged in a square planar grid, i.e. defining orthogonal directions along which sequences of coupling pegs are arranged. The distance between neighbouring coupling pegs is uniform and equal in both directions. This or similar arrangements of coupling members at coupling locations defining a regular planar grid allow the toy construction elements to be interconnected in a discrete number of positions and orientations relative to each other, in particular at right angles with respect to each other. The toy construction elements shown here, in FIGS. 1-3, are of the passive type, without additional functionality beyond mechanical model building, such as electromagnetic, electronic, optical, or the like. However, some embodiments of toy construction sets may also include active toy construction elements that are configured to perform user perceptual functions, e.g. emit light, sound, impart motion, etc.

FIG. 4 shows an embodiment of a toy system as disclosed herein. The toy system comprises a tablet computer 410 having stored thereon an AR App executing an AR-based digital game application. The tablet computer 410 comprises a display 411 and a digital camera 412. The tablet computer further comprises a processing unit executing the AR App and a storage medium for storing game-related data. It will be appreciated that, instead of a tablet computer, the toy system may include another type of suitably programmed data processing device or system, including a display, a processing unit, and an image capture device. Examples of suitable data processing systems include a personal computer, a desktop computer, a laptop computer, a handheld computer, a game console, a handheld entertainment device, a smart phone, or any other suitably programmable computer.

The toy system further comprises a reference toy 440. In this example the reference toy 440 is a toy construction model constructed from a plurality of toy construction elements, e.g. toy construction elements of the type described in connection with FIGS. 1-3.

The display 411 is operatively coupled to (e.g. integrated into) the tablet computer 410, and operable to display, under the control of the processing unit of the tablet computer 410, a video image. In the example of FIG. 4, the display is a touch-sensitive display allowing the tablet computer to receive user inputs such that the user may interact with the AR-based digital game executed on the tablet computer 410. It will be appreciated that the data processing system may comprise alternative or additional user interface devices for allowing the user to interact with the digital game, e.g. by gestures, eye tracking, etc.

The digital camera 412 is a video camera operable to capture video images of a real-world scene 430. In the example of FIG. 4, the video camera is integrated into the handheld tablet computer 410, i.e. the user may move the tablet computer around so that the current field of view 420 of the digital camera covers different parts of the real-world scene from different viewpoints. The real-world scene 430 may e.g. include a surface such as a desktop, a floor, or the like on which a variety of objects 431 and 440 are positioned. The digital camera is operatively coupled to (e.g. integrated into) the tablet computer 410 and operable to forward the captured video image to the processing unit of the tablet computer 410.

The digital camera 412 captures video images of the real-world scene 430 and the tablet computer displays the captured video images on the display 411. In the example of FIG. 4, the real-world scene 430 comprises the reference toy 440 which is shown within the field of view 420 of the camera 412. In addition to the reference toy 440, the real-world scene 430 may comprise further objects 431 such other household objects, toys, or the like.

The captured video images are displayed by the tablet computer 410 on its display 411. Therefore, a user may move the reference toy 440 around and/or otherwise manipulate the reference toy 440 within the field of view 420 of the digital camera 412 and view live video images from the digital camera 412 of the reference toy and at least of parts of the real-world scene 430. Alternatively or additionally, the user may change the position and/or orientation of the digital camera so as to capture images of a (e.g. stationary) reference toy from different positions. Additionally, the computer may be operable to store the captured video images on a storage device, such as an internal or external memory, of the computer, and/or forward the captured video to another computer, e.g. via a computer network. For example, the computer may be operable to upload the captured video images to a website.

The tablet computer 410 is suitably programmed to execute an AR-enabled digital game, during which the computer performs image processing on the captured video images so as to detect the reference toy 440 within the captured video image. Responsive to the detected reference toy, the computer may be programmed to generate a modified video image, e.g. a video image formed as the captured video image having overlaid to it a computer-generated image, e.g. a video image wherein at least a part of the captured video image is replaced by a computer-generated image. The computer 410 is operable to display the modified video image on the display 411. For the purpose of the present description, a computer operable to implement AR functionality operatively connected to a video camera and a display will also be referred to as an AR system.

Image processing methods for detecting AR markers and for generating modified video images responsive to detected objects are known as such in the art (see e.g. Daniel Wagner and Dieter Schmalstieg, "ARToolKitPlus for Pose Tracking on Mobile Devices", Computer Vision Winter Workshop 2007, Michael Grabner, Helmut Grabner (eds.), St. Lambrecht, Austria, February 6-8, Graz Technical University).

In the example of FIG. 4, the physical reference toy 440 is a toy construction model constructed from conventional toy construction elements, such as toy construction elements of the type described in connection with FIGS. 1-3. It will be appreciated, however, that other embodiments may employ other types of reference toys.

Once the computer has recognized the reference toy, the user may manipulate the physical reference toy within the field of view of the digital camera, e.g. by moving and/or rotating the physical reference toy. The computer 410 tracks the position and orientation of the recognized reference toy. The computer displays the live video feed of the video camera on the display 1 and adds, responsive to the detected position and orientation of the reference toy, augmented reality special effects to the live video feed.

FIG. 5 shows a flow diagram of an example of a computer-implemented process as disclosed herein. The process may e.g. be performed by the tablet computer 410 of FIG. 4, when suitable programmed, or by another suitable AR-enabled data processing system.

In initial step S1, the process recognizes a reference toy in one or more captured video images received from a digital camera, e.g. from the built-in camera 412 of the tablet computer 410. To this end, the process may initially allow the user to select one of a plurality of available reference toys, e.g. in an on-screen selection menu. In some embodiments, the process may optionally display building instructions for constructing the reference toy from toy construction elements of a toy construction set.

The user may then place the reference toy on a table or other surface and direct the digital camera to capture video images of the reference toy. During the initial recognition step, the computer may display a frame, object outline or other visual guides in addition to the live video feed in order to aid the user in properly directing the digital camera. An example of a user-interface aiding the positioning of the reference toy is shown in FIG. 7.

Figure 7:
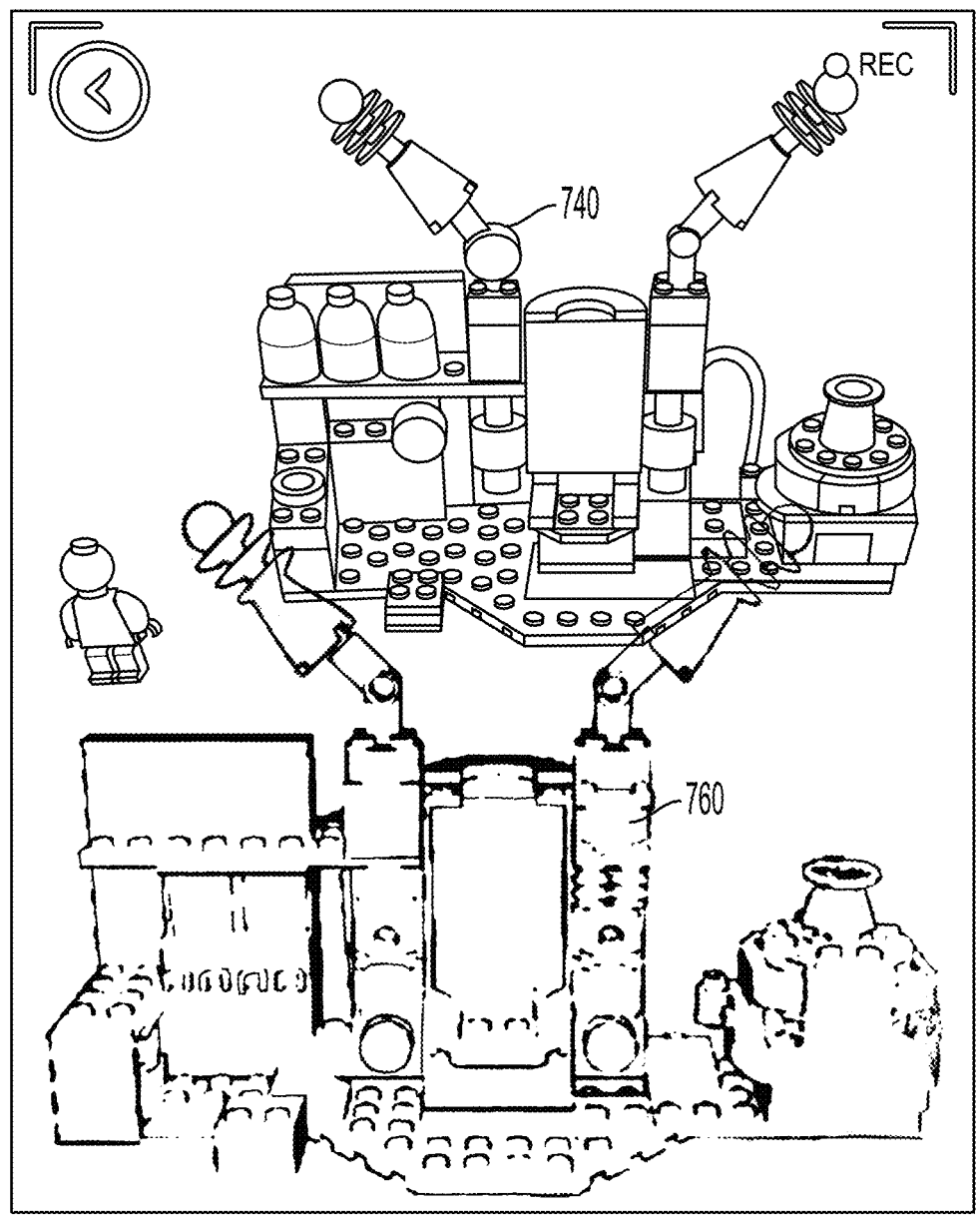

In particular, FIG. 7 shows an example of the content displayed by the tablet computer 410 of the example of FIG. 4. The process displays a live video image of the reference toy 740 which in this example is a building structure constructed from toy construction elements as described above. The process further displays an outline 760 of the known reference toy so as to aid the user in positioning the digital camera at a suitable angle and distance relative to the physical reference toy in order to facilitate reliable recognition.

Still referring o FIG. 5, the process recognizes the reference toy using a suitable mechanism for object recognition known as such in the field of computer vision, e.g. based on a set of recognisable key features, such as corners, edges, colors etc. To this end, the process may retrieve known reference features of the reference toy from a storage device 513, e.g. from an internal memory of the computer, from a cloud based storage or the like.

Once the process has recognized the reference toy, the process proceeds at step S2 where the process enters a game mode in which the process receives captured video images from the digital camera in real time. The process tracks the position and orientation of the recognized reference toy in the captured images, and creates computer-generated content, such as graphics, and displays the captured live video overlaid (i.e. augmented) with the generated content. The generated content may also be generated responsive to in-game events, e.g. user inputs to the computer, game level, etc.

Figure 6:
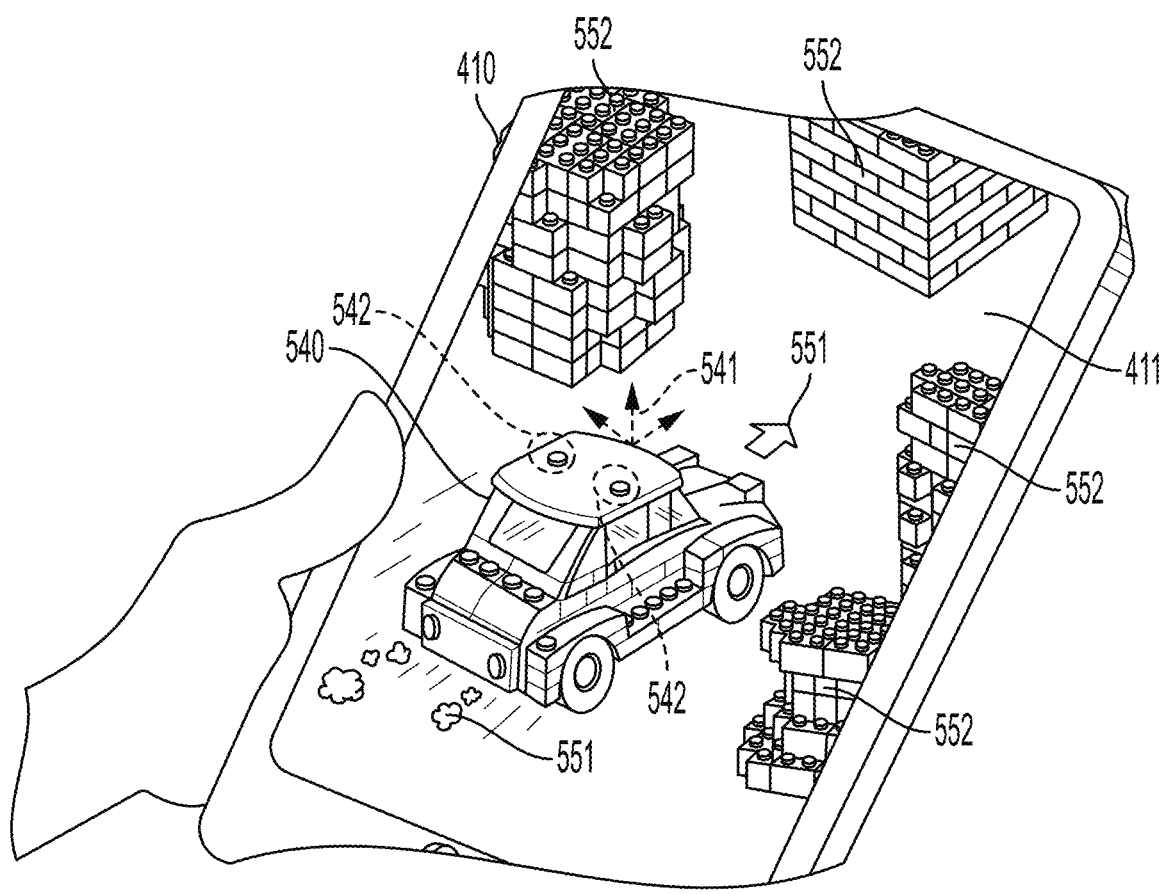
FIGS. 6-9 show examples of an AR-enabled digital game experience.

FIG. 6 shows an example of the content displayed by the tablet computer 410 of the example of FIG. 4 during step S2. The process displays a live video image of the reference toy 540 which in this example is a toy car constructed from toy construction elements as described above. The process further displays computer-generated AR content, such as virtual objects 552 or graphical animations 551. The AR content is displayed at positions relative to the reference toy in the image. To this end, the process tracks the reference toy in the field of view of the digital camera and may determine an internal coordinate system 541 of the reference toy. While shown in dotted lines in FIG. 6 for illustration, it will be appreciated that the determined coordinate system 541 will normally not been displayed on the display. The process further identifies one or more predetermined reference positions relative to the reference toy. The positions of the reference positions may be retrieved from the storage device 513 and e.g. be expressed as coordinates relative to the internal coordinate system 541 associated with the reference toy. Hence, the reference positions are at fixed locations relative to the reference toy, e.g. positions on the surface of the reference toy. Each reference position has a sub-image associated with it, e.g. a sub-image surrounding or otherwise in a fixed spatial relationship with the reference position. In FIG. 6, examples of sub-images are indicated by dotted circles 542 which may or may not be displayed by the system. The size of the sub-images may be pre-determined, either in absolute image dimensions (e.g. number of pixels), or relative to the current dimension of the reference toy as currently viewed in the image. The information about the sub-images (position, shape, size) is retrieved from the storage device 513 where it may be stored in association with each reference toy.

In step S3, e.g. responsive to a game event, the process prompts the user to manipulate the reference toy at one or more of the reference positions. To this end, the process may create and render content, such as sound, or graphical content.

Figure 8:
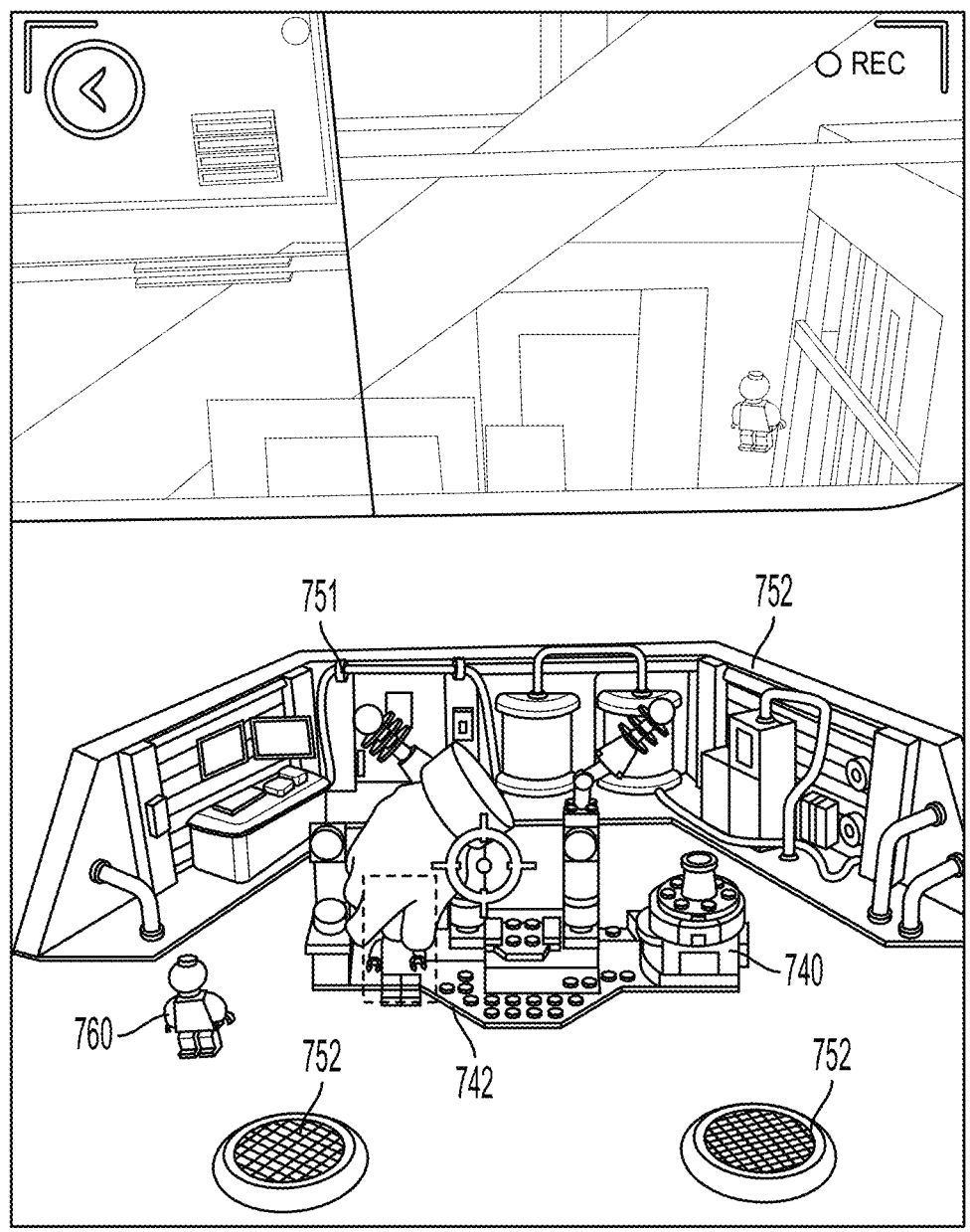

FIG. 8 shows an example of the content displayed by the tablet computer 410 of FIG. 4 during step S3. The process displays a live video image of the reference toy 740 which in this example is a building structure constructed from toy construction elements as described above. The process further displays computer-generated AR content, such as virtual objects 752 or graphical animations. In particular, the process prompts the user to place a physical figurine at a predetermined reference position within the building structure 740 where the reference position has a sub-image 742 associated with it. In this example, the process prompts the user by displaying an animated hand 751 placing a virtual figurine at the reference position. It will be appreciated that, in other embodiments, the system may prompt the user to perform a different type of manipulation of the real-world scene in particular, of the reference toy.

Still referring to FIG. 5, in step S4, the process selectively monitors the contents of the sub-image 742 so as to detect whether the user indeed performs the prompted manipulation, e.g. whether the user indeed positions a figurine at the reference position and, optionally, whether the user positioned the correct figure at that position. To this end, the process may repeatedly feed the image contents of the sub-image into a suitable image-processing process, e.g. into an object recognition process, e.g. a neural network based process as described in WO 2016/075081. In the example of FIG. 8, the object recognition process returns an indication as to whether a figurine is detected in the sub-image and, optionally, which type of figurine is detected. It is worthwhile noting that the selective monitoring of only the sub-image 742 avoids erroneous detection of other figurines that may incidentally be positioned within the user's play area, e.g. figurine 760. The type of image processing performed on the sub-image depends on the type of manipulation to be detected. For example, if the manipulation involves turning a wheel such that one of a number of colored fields becomes visible a the reference position, the image processing may merely involve a color detection of a dominant color of the sub-image. It will be appreciated that, in some embodiments, the process may continuously, or quasi continuously, feed the contents of the sub-image into the image processing process. For example, the process may feed the contents of the sub-image of each captured frame of a video stream into the image processing process. In other embodiments, e.g. when the image processing process requires considerable computing power, the process may only intermittently feed the contents of the sub-image into the image processing process.

When the process has detected the prompted manipulation, e.g. the positioning of a physical figurine at the reference position, the process proceeds at step S5; otherwise the process proceeds at step S6.

Figure 9:
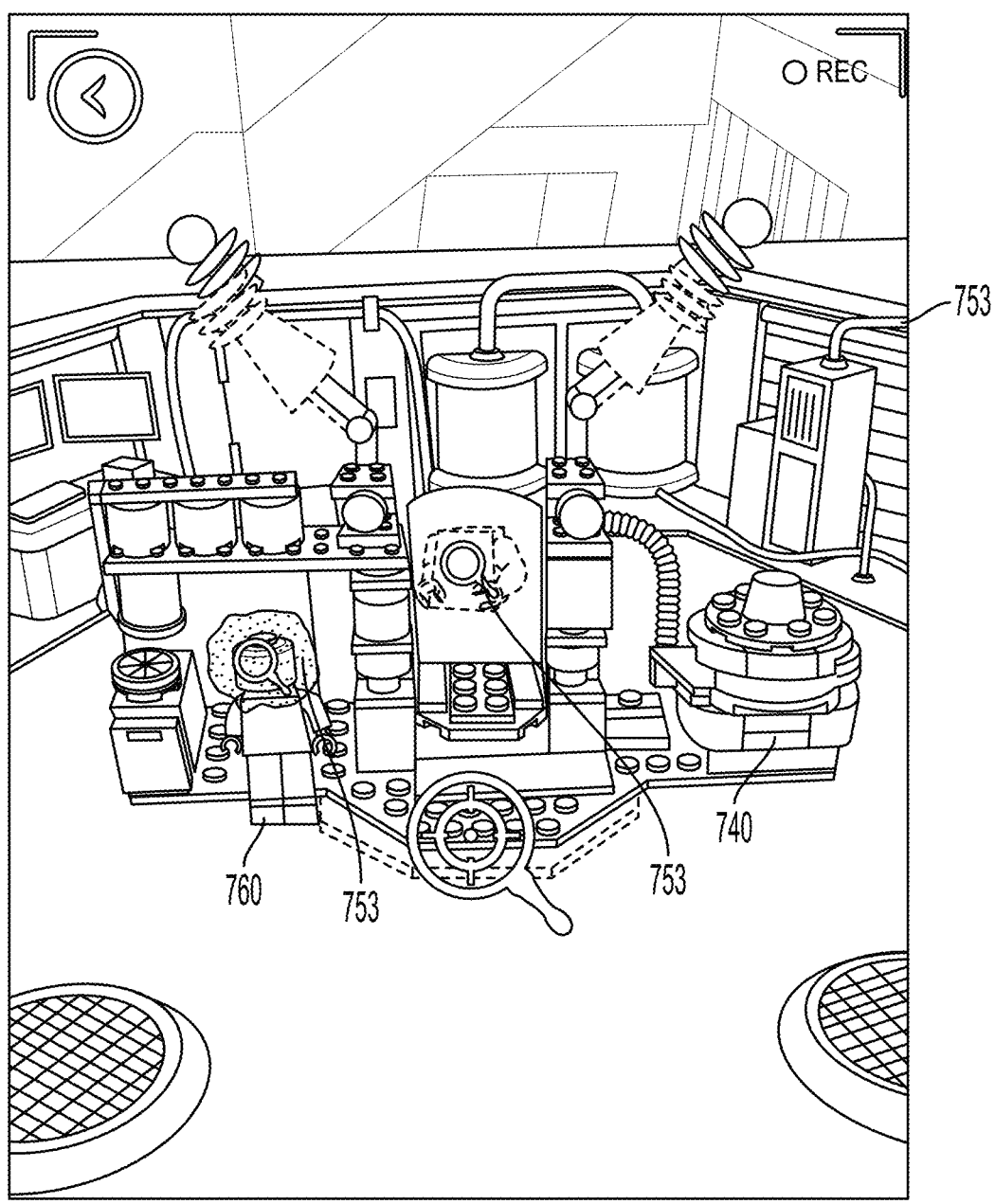

At step S5, i.e. responsive to detecting the manipulation, the process generates and renders appropriate computer-generated AR content, e.g. as illustrated in FIG. 9.

FIG. 9 shows an example of the content displayed by the tablet computer 410 of FIG. 4 during step S5. The process displays a live video image of the reference toy 740 which in this example is a building structure constructed from toy construction elements as described above. The live video image now also includes the figurine 760 now positioned at the reference position. The process further displays computer-generated AR content 753 indicating to the user successful performance of the task the user has been prompted to perform.

Again referring to FIG. 5, the process then proceeds with the digital game, e.g. by returning to step S3 and prompting the user to perform another manipulation action.

At step S6, i.e. when the process has not yet detected the manipulated as prompted (e.g. the positioning of a figurine at the reference position as prompted), the process reacts accordingly. For example, in the example of FIG. 5, the process determines whether a predetermined time has lapsed. The time may reflect the time a user is granted to perform the prompted manipulation. The time may e.g. depend on the level of difficulty of the game. When the timer has not yet expired, the process may return to step S4 and keep monitoring the sub-image.

If the timer has expired, the process may proceed to step S7 and create and render computer-generated content reflecting the failure to perform the task the user was prompted to do.

The process then proceeds with the digital game, e.g. by returning to step S3 and prompting the user to perform another manipulation action.

It will be appreciated that many variations of the above process are possible. For example, the detectable user manipulation of the physical reference toy need not be the addition of a figurine or other object, but may involve another type of manipulation of the physical reference toy.

Also, the detection of the manipulation may not require a complex object recognition process but may simply involve detecting a dominant color or texture in the sub-image. For example, in the example of FIG. 6, the process may detect adding a blue toy element on the roof of the car (i.e. in one or both of sub-images 542). The process may then create computer-generated content resembling a police car (e.g. flashing blue animations and siren sounds).

Figure 10A:
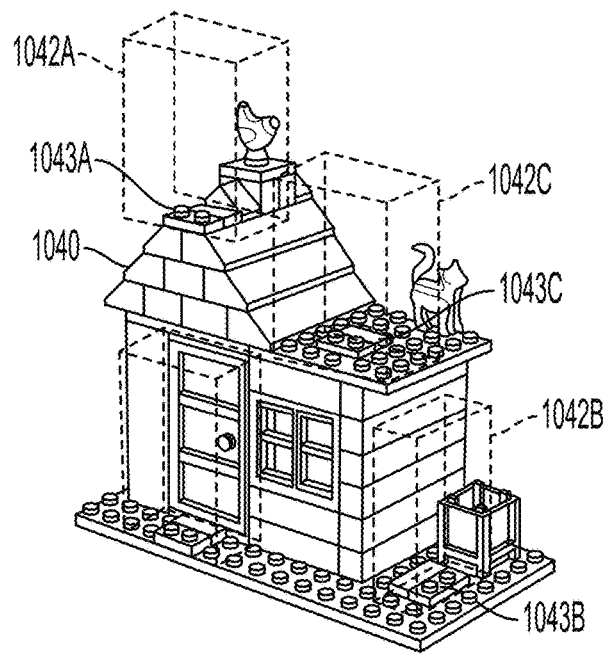
FIGS. 10A-C illustrate another example of a reference toy.
Figure 10B:
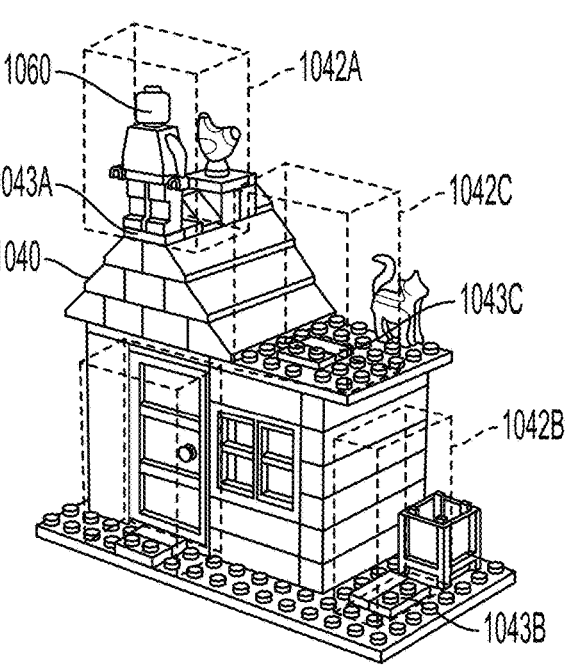

FIGS. 10A-B illustrate another example of a reference toy 1040. In this example the reference toy 1040 is a toy construction model resembling a building. The building is constructed from a plurality of toy construction elements, e.g. toy construction elements of the type described in connection with FIGS. 1-3. The reference toy 1040 may be part of an embodiment of a toy system described herein, e.g. of the toy system described in connection with FIG. 4.

Figure 10C:
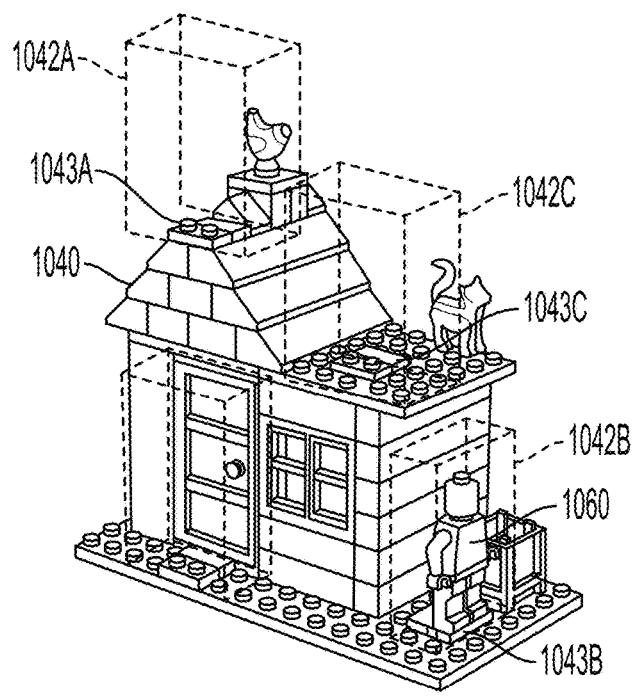

The reference toy 1040 defines three reference positions, each reference position having a respective sub-image associated with it, e.g. a sub-image surrounding or otherwise in a fixed spatial relationship with the reference position. In FIGS. 10A-C, the reference positions are made visible to the user in that each reference position is defined by a specific toy construction element 1043A-C, respectively, which aid the user in identifying where to manipulate the reference toy, e.g. where to position a figurine, e.g. when prompted by the AR enabled digital game.

In the example of FIGS. 10A-C, each reference position has associated with it a predetermined reference volume 1042A-C, each indicated by dotted lines in FIGS. 10A-C. The process may then determine the boundaries in each captured image such that the sub-image covers the entire reference volume as seen from the current viewpoint of the image capturing device.

In FIG. 10A, all reference volumes are empty. In FIG. 10B, the user has positioned a figurine in reference volume 1042A which is thus detectable by the suitably programmed data processing system executing an AR enabled game implementing an embodiment of the process as described herein, e.g. by the tablet computer of FIG. 4. In particular, as the process selectively only analyses the sub-images depicting the reference volumes, the risk for erroneously detecting the other figurines or decorations of the building is reduced. The process can also, in an efficient manner, detect which of the reference positions has been manipulated, e.g. at which reference position a figurine has been placed. For example, FIG. 10C shows the reference toy 1040 with a figurine 1060 positioned within reference volume 1042B.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A toy system, the toy system comprising a data processing system and one or more toys, the one or more toys including at least one reference toy having a visual appearance recognisable by the data processing system in a captured image of a real-world scene including said at least one reference toy, the data processing system comprising an image capturing device, a processing unit, and a display, wherein the data processing system has stored thereon information associated with the at least one reference toy, the information including at least one predetermined reference position defined relative to the at least one reference toy; and wherein the data processing system is configured to:
- capture a sequence of images of a real-world scene, the real-world scene including said at least one reference toy;
- process the captured images to detect and recognize said at least one reference toy within the real-world scene;
- retrieve the at least one predetermined reference position from the stored information associated with the recognized at least on reference toy;
- process the captured images to identify the at least one predetermined reference position within at least a first image of the sequence of captured images;
- selectively process a sub-image within the first image, the sub-image depicting said identified reference position, wherein the sub-image has a shape and size smaller than the first image, to selectively detect a user manipulation of the real-world scene at the identified at least one predetermined reference position;
- responsive to detecting the user manipulation, generate and render computer-generated perceptual information associated with the detected user manipulation.

2. A toy system according to claim 1, wherein the data processing system is configured to:
- generate and render computer-generated perceptual information prompting the user to manipulate the real-world scene at the identified at least one reference position;
- process the captured images to detect a user manipulation of the real-world scene at the identified at least one predetermined reference position;
- responsive to detecting the user manipulation, generate and render computer-generated perceptual information associated with the detected user manipulation.

3. A toy system according to claim 2, wherein the data processing system is configured to selectively look for a detectable user manipulation at the reference position during a limited time window after prompting the user to perform the manipulation at the reference position.

4. A toy system according to claim 3, wherein the data processing system is configured to create and render computer-generated content depending on whether a user manipulation at the reference position has been detected within the time window or not.

5. A toy system according to claim 3, wherein the detected user manipulation includes one or more of the following user manipulations: moving an element of the reference toy, positioning an object at the reference position, moving an object away from the reference position, changing the orientation of an object at the reference position.

6. A toy system according to claim 3, wherein detecting the user manipulation comprises providing the sub-image as an input to a computer vision process, in particular a feature detection process or an object recognition process.

7. A toy system according to claim 6, wherein the computer vision process is an object recognition process based on a neural network.

8. A toy system according to claim 1, wherein the reference toy is a toy construction model constructed from a plurality of toy construction elements.

9. A toy system according to claim 1, wherein the data processing system is configured to selectively only detect one or a predetermined set of types of user interactions.

10. A toy system, the toy system comprising a data processing system and one or more toys, the plurality of toys including at least one reference toy having a visual appearance recognisable by the data processing system in a captured image of a real-world scene including said at least one reference toy, the data processing system comprising an image capturing device, a processing unit, and a display, wherein the data processing system has stored thereon information associated with the at least one reference toy, the information including at least one predetermined reference position defined relative to the at least one reference toy; and wherein the data processing system is configured to:
- capture a sequence of images of a real-world scene, the real-world scene including said at least one reference toy;
- process the captured images to detect and recognize said at least one reference toy within the real-world scene;
- retrieve the at least one predetermined reference position from the stored information associated with the recognized at least on reference toy;
- process the captured images to identify the at least one predetermined reference position within at least a first image of the sequence of captured images;
- generate and render computer-generated perceptual information prompting the user to manipulate the real-world scene at the identified at least one reference position;
- process the captured images to detect a user manipulation of the real-world scene at the identified at least one predetermined reference position;
- responsive to detecting the user manipulation, generate and render computer-generated perceptual information associated with the detected user manipulation;

wherein the data processing system is configured to selectively look for a detectable user manipulation at the reference position during a limited time window after prompting the user to perform the manipulation at the reference position.

11. A toy system according to claim 10, wherein the data processing system is configured to create and render computer-generated content depending on whether a user manipulation at the reference position has been detected within the time window or not.

12. A toy system according to claim 10, wherein the detected user manipulation includes one or more of the following user manipulations: moving an element of the reference toy, positioning an object at the reference position, moving an object away from the reference position, changing the orientation of an object at the reference position.

13. A toy system according to claim 10, wherein the reference toy is a toy construction model constructed from a plurality of toy construction elements.

14. A toy system according to claim 10, wherein the data processing system is configured to selectively only detect one or a predetermined set of types of user interactions.

* * * * *